(12) United States Patent
Wurth

(10) Patent No.: US 9,968,072 B2
(45) Date of Patent: May 15, 2018

(54) MEASURING DEVICE USEFUL FOR ANIMAL WEIGHT MANAGEMENT

(71) Applicant: Nestec SA, Vevey (CH)

(72) Inventor: Stephen Andrew Wurth, St. Louis, MO (US)

(73) Assignee: Nestec S.A., Vevey (CH)

( * ) Notice: Subject to any disclaimer, the term of this patent is extended or adjusted under 35 U.S.C. 154(b) by 473 days.

(21) Appl. No.: 13/778,839

(22) Filed: Feb. 27, 2013

(65) Prior Publication Data

US 2014/0238305 A1    Aug. 28, 2014

(51) Int. Cl.
*A01K 5/01*    (2006.01)
*G01F 19/00*   (2006.01)

(52) U.S. Cl.
CPC ............ *A01K 5/0114* (2013.01); *G01F 19/00* (2013.01)

(58) Field of Classification Search
CPC .............................. A01K 5/0114; G01F 19/00
USPC ........................ 119/51.02, 61.5, 61.56, 61.57
See application file for complete search history.

(56) References Cited

U.S. PATENT DOCUMENTS

| | | | | |
|---|---|---|---|---|
| 797,314 A | * | 8/1905 | Owens | 220/4.21 |
| 913,175 A | * | 2/1909 | Thompson | 119/61.4 |
| 1,562,620 A | * | 11/1925 | Dill | 119/61.1 |
| 1,572,483 A | * | 2/1926 | Hoier | 119/52.1 |
| 2,213,837 A | * | 9/1940 | Gill | 220/575 |
| 3,526,138 A | * | 9/1970 | Swett et al. | 73/426 |
| 3,661,121 A | * | 5/1972 | Zielin | 119/61.57 |
| 4,085,706 A | | 4/1978 | Evans | |
| 4,205,629 A | * | 6/1980 | Wix | 119/51.5 |
| 4,253,424 A | * | 3/1981 | Williams | 119/61.4 |
| 4,270,490 A | | 6/1981 | Kopp | |
| 4,953,506 A | | 9/1990 | Sanders | |
| 5,125,363 A | * | 6/1992 | McGaha | 119/51.5 |
| 5,377,620 A | * | 1/1995 | Phillippi | 119/51.12 |
| 5,501,176 A | * | 3/1996 | Tully | 119/61.57 |
| 5,787,839 A | * | 8/1998 | Magnant et al. | 119/51.5 |
| 6,427,626 B1 | * | 8/2002 | Quinlan et al. | 119/51.01 |
| 6,786,177 B1 | * | 9/2004 | Lemkin | 119/51.01 |
| 7,207,291 B1 | * | 4/2007 | Watts | 119/61.5 |
| 7,347,623 B2 | | 3/2008 | Cawley | |

(Continued)

FOREIGN PATENT DOCUMENTS

| | | | | |
|---|---|---|---|---|
| JP | 2000006972 A | * | 1/2000 | ............ B65D 21/08 |
| WO | 2009029999 | | 3/2009 | |

OTHER PUBLICATIONS

International Search Report corresponding to related International Patent Application No. PCT/US2013/027942 dated May 3, 2013.

(Continued)

*Primary Examiner* — Son T Nguyen

(74) *Attorney, Agent, or Firm* — Ronald A. Burchett; Julie M. Lappin

(57) ABSTRACT

The invention provides measuring devices for managing the weight of animals and methods of using the measuring devices. In a general aspect, the measuring devices comprise a container having a first side with a cavity and a second opposing side having a cavity that is larger than the cavity of the first side. The first side cavity is sized to hold an amount of food that restricts calorie intake of an animal. The second side cavity is sized to hold an amount of food that provides daily requirement for weight management of an animal.

17 Claims, 2 Drawing Sheets

(56) References Cited

U.S. PATENT DOCUMENTS

| | | | |
|---|---|---|---|
| 8,011,322 B1* | 9/2011 | Jackson | 119/52.2 |
| 8,424,489 B2* | 4/2013 | Desrosiers | 119/61.54 |
| 2003/0033986 A1* | 2/2003 | Brown | 119/61 |
| 2005/0039690 A1* | 2/2005 | Sage, Jr. | 119/61.5 |
| 2006/0075974 A1* | 4/2006 | Kennedy | 119/61.5 |
| 2006/0231039 A1* | 10/2006 | Abinanti et al. | 119/61.56 |
| 2007/0074669 A1* | 4/2007 | Montague | 119/61.56 |
| 2008/0072829 A1* | 3/2008 | Kerrigan et al. | 119/61.5 |
| 2008/0276705 A1* | 11/2008 | Yeung | 73/426 |
| 2008/0282797 A1* | 11/2008 | Sailer et al. | 73/426 |
| 2009/0044755 A1* | 2/2009 | Volotzky | 119/61.54 |
| 2010/0229643 A1 | 9/2010 | Lee | |
| 2010/0263596 A1 | 10/2010 | Schumann et al. | |
| 2011/0017141 A1* | 1/2011 | Hewson et al. | 119/51.5 |
| 2011/0308470 A1* | 12/2011 | Vermeegen | 119/51.5 |
| 2012/0079881 A1* | 4/2012 | Olson | 73/426 |
| 2012/0199076 A1* | 8/2012 | Biede et al. | 119/51.02 |

OTHER PUBLICATIONS

International Written Opinion corresponding to related International Patent Application No. PCT/US2013/027942 dated May 3, 2013.

\* cited by examiner

MEASURING DEVICE USEFUL FOR ANIMAL WEIGHT MANAGEMENT

CROSS REFERENCE TO RELATED APPLICATIONS

This application claims priority to U.S. Provisional Application Ser. No. 61/605,953 filed Mar. 2, 2012, the disclosure of which is incorporated herein by this reference.

BACKGROUND OF THE INVENTION

Field of the Invention

The invention relates generally to measuring devices and particularly to measuring devices and methods for using such measuring devices for managing the weight of animals.

Description of Related Art

Research has shown that animal owners and caregivers use food as a physical representation of their love and affection toward their animals, particularly pets such as dogs and cats. Unfortunately, feeding animals in this manner often leads to obesity. As a result, animal weight management is a challenge for owners, veterinarians, caregivers, and others responsible for feeding animals. Typically, veterinarians suggest an animal food that is relatively low in calories in an effort to mange weight of animals, particularly to manage health issues associated with being overweight or obese. However, it is often difficult to know how much food to provide an animal without having the animal consume more than is desirable, particularly if the animal is to maintain a healthy weight or lose weight if the animal is overweight or obese. Typically, the owner or caregiver simply fills up a standard feeding device such as a food bowl with food and allows the animal to eat Ad libitum. When an animal is overweight or obese, owners and caregivers typically restrict the amount of food available to the animal by partially filling the feeding device, often guessing on the amount to put in the device. The problem is complicated because most feeding devices are simple food containers that are made without regard for how they will affect food consumption. The manufactures rely on the caregiver to fill, underfill, or overfill the container as necessary to feed the animal a meal. Unfortunately, as stated, many caregivers overfill the container and the animal becomes overweight or obese. The problem is exacerbated when an owner, caregiver, or others overfeed to please the animal or to lessen unwanted behaviors such as begging for food.

U.S. Pat. No. 4,270,490 discloses animal feed storage bowls comprising a pair of bowls with cooperating sections that allow one to form cover for food storage. U.S. Pat. No. 4,953,506 discloses feed bowls for animals that have a base connected to upper portion h a sprung bayonet connecting assembly. U.S. Pat. No. 7,347,623 discloses collapsible bowls for holding solid and liquid foodstuffs. These patents, however, do not disclose devices, particularly food bowls, that are useful for managing the weight of animals. There is therefore, a need for new devices and methods that make it easy for an animal owner or caregiver to feed the proper amount of food to maintain as weight for an animal or to reduce the weight of an animal that is overweight or obese, particularly when these concepts are (1) combined in a single device and/or (2) customized for a particular animal.

SUMMARY OF THE INVENTION

It is, therefore, an object of the invention to provide measuring devices suitable for managing the weight of animals.

It is another object of the invention to provide methods for managing the weight of animals.

It is a further object of the invention to provide measuring devices suitable for helping animals achieve a healthy weight.

It is another object of the invention to provide methods for helping animals achieve a healthy weight.

It is still another object of the invention to provide kits useful for managing the weight of animals.

These and other objects are achieved using a measuring device comprising a container having a first side with a cavity and a second opposing side baying a cavity that is larger than the first side cavity. The first side cavity is sized to hold an amount of food that contains fewer calories than required to maintain the weight of an animal and the second side cavity is sized to hold an amount of food that contains the amount of calories required to maintain the weight of an animal.

Additional and further objects, features, and advantages of the invention will be readily apparent to those skilled in the art.

DETAILED DESCRIPTION OF THE INVENTION

Definitions

Figure 1:
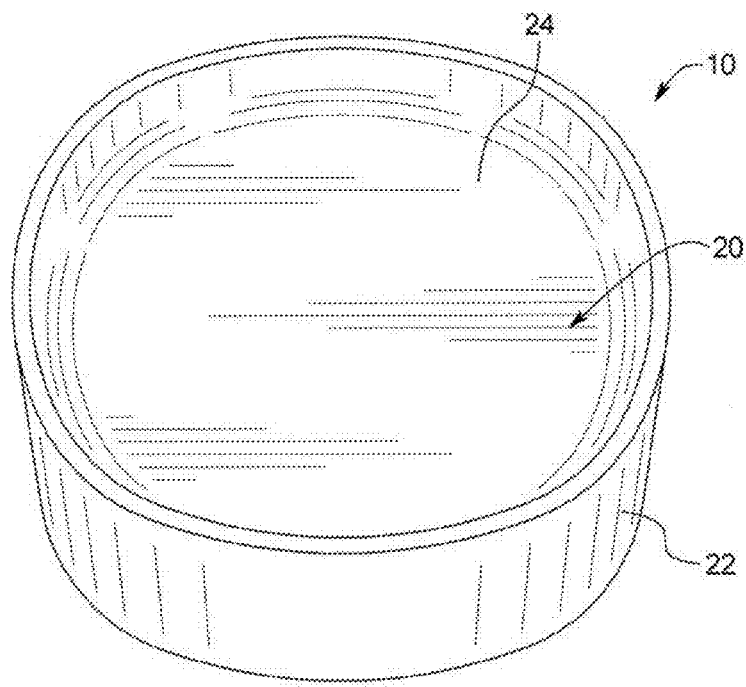
FIG. 1 shows a perspective view of a first side of at measuring device in an embodiment of the invention.

The term "animal" means any animal that could benefit from weight management, i.e., maintaining a healthy weight or achieving a healthy weight, including avian, bovine, canine, equine, feline, hicrine lupine, murine, ovine, or porcine animals.

The term "companion animal" means domesticated animals such a cats, dogs, rabbits, guinea pigs, ferrets, hamsters, mice, gerbils, horses, cows, goats, sheep, donkeys, pigs, and the like.

The term "larger than" means that a recessed portion or cavity as described herein holds a greater volume of material or materials.

The term "customized measuring device" means a measuring device of the invention that has been designed for a particular animal.

The term "customized food" means a food that has been designed for a particular animal, e.g., a customized food disclosed in U.S. Pat. No. 6,358,546.

The term "single package" means that the components of a kit are physically associated in or with one or more containers and considered a unit for manufacture, distribution, sale, or use. Containers include, but are not limited to, bags, boxes, cartons, bottles, packages of any type or design or material, over-wrap, shrink-wrap, affixed components (e.g., stapled, adhered, or the like), or combinations thereof. A single package may be containers of individual components physically associated such that they are considered a unit for manufacture, distribution, sale, or use.

The term "virtual package" means that the components of a kit are associated by directions on one or more physical or virtual kit components instructing the user how to obtain the other components, e.g., a bag or other container containing one component and directions instructing the user to go to a website, contact a recorded message or a fax-back service, view a visual message, or contact an instructor to obtain instructions on how to use the kit or safety or technical information about one or more components of a kit.

As used throughout, ranges are used herein in shorthand, to avoid having to set out at length and describe each and every value within the range. Any appropriate value within the range can be selected, where appropriate, as the upper value, lower value, or the terminus of the range.

As used herein and in the appended claims, the singular form of a word includes the plural, and vice versa, unless the context clearly dictates otherwise. Thus, the references "a", "an", and "the" are generally inclusive of the plurals of the respective terms. For example, reference to "a measuring device" or "a method" includes a plurality of such "measuring devices" or "methods". Similarly, the words "comprise", "comprises", and "comprising" are to be interpreted inclusively rather than exclusively. Likewise, the terms "include", "including" and "or" should all be construed to be inclusive, unless such a construction is clearly prohibited from the context. Where used herein the term "examples" particularly when followed by a listing of terms is merely exemplary and illustrative, and should not be deemed to be exclusive or comprehensive.

The devices, assemblies, kits, methods, compositions and other advances disclosed here are not limited to particular methodology, protocols and reagents described herein because, as the skilled artisan will appreciate, they may vary. Further, the terminology used herein is for the purpose of describing particular embodiments only, and is not intended to, and does not, limit the scope of that which is disclosed or claimed.

THE INVENTION

Figure 2:
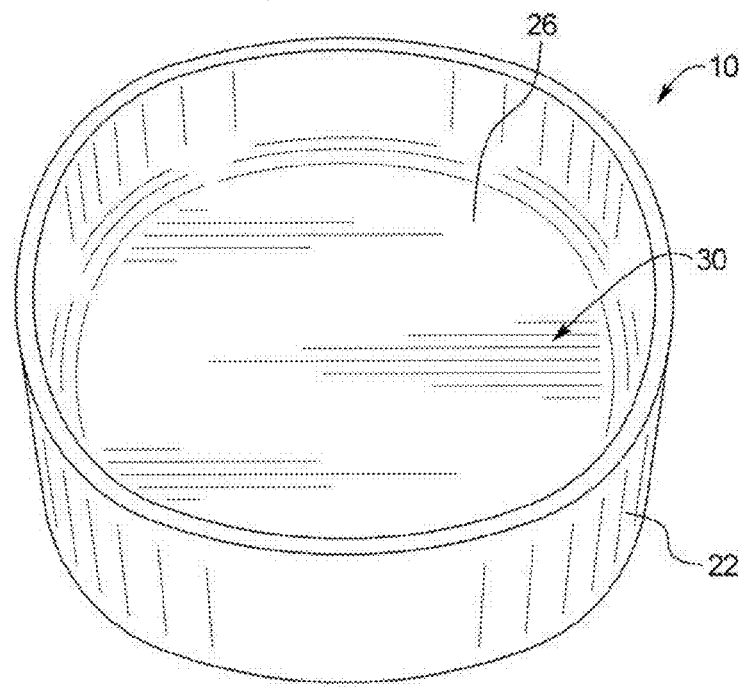
FIG. 2 shows a perspective view of as second side of a measuring device in an embodiment of the invention.

In one aspect, illustrated in FIGS. 1-2, the invention provides a measuring device 10 useful for managing the weight of animals. The measuring device 10 comprises a container 22 having a first side 20 with a recessed portion or cavity 24 and a second opposing side 30 having a recessed portion or cavity 26 that is larger than the recessed portion or cavity 24 of the first side 20. Cavity 26 is larger than cavity 24 by any useful amount for the intended purpose of the device, e.g., managing the weight of animals. In various embodiments, cavity 26 is at least 1.1 times larger than cavity 24, i.e., cavity 26 is capable of containing at least 1.1 times the volume of material as cavity 24. In preferred embodiments, cavity 26 is from about 1.1 to about 5 times larger than cavity 24, preferably 1.25 to 3 times. In other embodiments, cavity 26 is 1.2, 1.3, 1.4, 1.5, 1.6, 1.7, 1.8, 1.9, 2, 2.1, 2.2, 2.3, 2.4, 2.5, 2.6, 2.7, 2.8, 2.9 or 3 times larger than cavity 24 depending on the desired use, e.g., feeding one or more foods to animals in an effort to manage the weight of the animals. By being larger than cavity 24, cavity 26 has the capacity to contain a corresponding larger amount of food or other material.

Cavity 26 and cavity 24 have any shape suitable for using the measuring device for its intended purpose, particularly for managing the weight of animals. In preferred embodiments, the cavities have a concave shape, a concave shape with ripples along the surface of the concave shape, a concave shape with a dome in the bottom of the shape, a square box shape, a rectangular box shape, a pyramidal shape, and the like. The shape is selected based upon the intended use for the measuring device and the characteristics of the material being measured using the device. In a preferred embodiment, the cavities have a concave shape, particularly a concave shape useful for measuring foods and similar materials. In various embodiments, cavity 26 has one shape and cavity 24 has the same or a different shape.

In general, the measuring device 10 is filled for measuring according to instructions associated with the device, typically by filling level to the top of a particular cavity in the device, by filling a heaping amount in a particular cavity in the device, or by filling to one or more markers on a particular cavity in the device. For example, a cavity may have a line or other marker that is slightly below the top of the cavity; the food is filled to the line instead of to the top of the cavity to facilitate ease of use without spillage.

In preferred embodiments, measuring device 10 is a food bowl with two opposing cavities 26 and 24 having different sizes and capable of measuring and containing different amounts of food. In certain embodiments, the food bowl is associated with (1) a food or (2) a food and a different food. For example, the food bowl can be associated with a food designed to achieve and maintain a desired weight for an animal based on the amount of the food consumed by the animal. The food is fed to the animal in different amounts via the different sized cavities in the food bowl, i.e., one cavity designed to achieve a desired weight for the animal and the other cavity designed to maintain a desired weight for the animal. In another example, the food bowl can be associated with a food designed to achieve a desired weight for an animal and a different food designed to maintain a desired weight for the animal. The different foods are fed to the animal in amounts that are associated with the different cavities in the food bowl, i.e., the food associated with one cavity and the different food associated with the other cavity.

The food bowl and its respective cavities are associated, with the food or foods in any suitable manner. Generally, the food bowl is marketed by a food manufacturer that has designed one or more foods or brand of foods to be used in cavities 26 and 24 in predefined amounts, i.e., amounts that correspond to the amounts of food that can be placed in cavities 26 and 24 to achieve and maintain a desired weight for an animal. For example, a food manufacturer designs a specific food to contain a defined amount of nutrients and calories per unit of food. The food manufacturer also designs a food bowl of the invention to contain an amount of the food to achieve a desired weight of the animal and a different amount of the food to maintain the desired weight of the animal. Then, an animal caregiver responsible for the animal uses the food bowl, the associated food, and feeding instructions specifically associated with the food bowl and the food to achieve and maintain the weight of the animal. The caregiver feeds one amount of food by using one cavity in the food bowl and then flips the food bowl to feed a different amount of food. In another example, a food manufacturer designs a food to contain a defined amount of nutrients and calories per unit of food and a different food to contain a different amount of nutrients and calories per unit of food. The food manufacturer also designs a food bowl of the invention to contain an amount of the food to achieve a desired weight of the animal and an amount of the different food to maintain the desired weight of the animal. Then, an animal caregiver responsible for the animal uses the food bowl, the associated foods, and feeding instructions specifically associated with the food bowl and foods to achieve and maintain the weight of the animal. The caregiver feeds one the food by using one cavity in the food bowl and then flips the food bowl to feed the different food.

In various embodiments, measuring device 10 is a customized measuring device useful for managing the weight of a particular animal. Measuring device 10 is customized by sizing cavity 24 and cavity 26 to meet the nutritional or other needs of the particular animal, e.g., sized to contain one or more foods or amounts of foods that help the animal achieve or maintain a desired weight. In preferred embodiments, measuring device 10 is a customized food bowl customized for a particular animal based upon the characteristics of the animal, e.g., the phenotype of the animal, the genotype of the animal, or combination thereof. Cavity 24 and cavity 26 are sized to contain an amount of a food or customized food that will help the animal achieve a desired weight and an amount of the same or a different food or customized food that will help the animal maintain a desired weight. The customized food bowl can be associated with the foods or customized foods by any method as described herein that benefits the animal, e.g., a weight management plan for the animal designed by a caregiver, food manufacturer, veterinarian, or other healthcare professional. For example, the food bowl and the associated food or foods can be part of to kit as described herein or the food bowl can be obtained from a manufacturer and the associated food or foods can be obtain from the manufacturer or a different manufacturer along with feeding instructions that associate the food bowl and the food or foods, e.g., the feeding instructions can accompany the food; be available electronically via the internet; be available electronically via a cell phone or similar device, particularly by reading a bar code; or be available by other means.

In a preferred embodiment, the customized food bowl has indicia temporarily or permanently integrated into or affixed to the bowl that identifies the animal for which the bowl was customized, e.g., the animal's name or image temporarily or permanently integrated into or affixed to the bowl. The indicia can be in the form of words, symbols, pictures, photographs, figures, or combinations thereof as required or desired to identify the particular animal.

In some embodiments, measuring device 10 is used as follows. Cavity 24 is sized to contain an amount of food that meets the daily nutritional requirements of a specified animal and promotes weight loss by the animal. For example, cavity 24 can be sized to hold an amount of food that decreases caloric intake of an animal below the amount needed to maintain weight. The size of cavity 24 can be based on the type and characteristics of the food to be fed to the animal, e.g., the ingredients used to make the food and the calorie content of the ingredients; the type, weight, size, and age of the animal; the physical and biological aspects of the animal, e.g., the phenotype and genotype of the animal and the animal's health and disease states; the desired weight for the animal; and any desired weight loss for the animal. Guidelines can be based on regulatory recommendations of authorities such as the American Association of Feed Control Officials ("AAFCO"). Additional examples are given in Tables 1-4 below. The length of time for feeding the animal using cavity 24 can be any suitable duration, particularly until the animal achieves a desired weight. After achieving a desired weight loss, the measuring device 10 is flipped to utilize the opposing cavity 26 that is sized to contain an amount of food to enable the animal to maintain a desired weight, e.g., a healthy lean body weight. For example, cavity 26 is sized to contain an amount of food that provides a daily requirement for weight management of an animal. The size of cavity 26 can be based on the type and characteristics of the food to be fed to the animal, e.g., the ingredients used to make the food and the calorie content of the ingredients; the type, weight, size, and age of the animal; the physical and biological aspects of the animal, e.g., the phenotype and genotype and the animal's health and disease states; the desired weight for the animal; and any desired weight loss for the animal. Guidelines are based on regulatory recommendations of authorities such as AAFCO and the feeding instruction from food manufacturers. Additional examples are given in Tables 1-4 below. For example, an animal that is overweight or obese needs to lose weight until a desired weight is achieved. Then, the animal needs to maintain that weight. If the animal gets excess food (e.g., from treats or extra food from a caregiver or from access to natural foods) and gains weight, the animal again needs to lose weight until the desired weight is achieved. Unfortunately, this cycle may continue throughout the animal's life. The device of the present invention provides a way to conveniently manage these issues and the animal's weight. The device has one cavity that when filled contains an amount of food that will restrict caloric intake and cause the animal consuming the food to lose weight. That cavity is used to feed the animal until the desired weight is achieved. In addition, the device has another cavity that when filled contains an amount of food that will provide a caloric intake that causes the animal consuming the food to maintain its weight. That cavity is used to feed the animal until the animal's weight increases, if at all. If the animals weight increases, the device is flipped and the animal is fed from the cavity that restricts caloric intake until the desired weight is again achieved.

In some embodiments, measuring device 10 is used as follows. Cavity 26 is sized for enough food that meets the daily nutritional requirements of a specified animal and promotes weight gain by the animal. For example, cavity 26 can be sized to hold an amount of food that increases caloric intake of an animal above the amount needed to maintain weight. The size of cavity 26 can be based on the type and characteristics of the food to be fed to the animal, e.g., the ingredients used to make the food and the calorie content of the ingredients; the type, weight, size, and age of the animal; the physical and biological aspects of the animal, e.g., the phenotype and genotype of the animal and the animals health and disease states; the desired weight for the animal; and any desired weight gain for the animal. Guidelines can be based on regulatory recommendations of authorities such as the American Association of Feed Control Officials ("AAFCO"). The length of time for feeding the animal using cavity 26 can be any suitable duration, particularly until the animal achieves a desired weight. After achieving a desired weight gain, the measuring device 10 is flipped to utilize the opposing cavity 24 that is sized to provide enough food to enable the animal to maintain a desired weight, e.g., a healthy body weight. For example, cavity 24 is sized to hold an amount of food that provides a daily requirement for weight management of an animal. The size of cavity 24 can be based on the type and characteristics of the food to be fed to the animal, e.g., the ingredients used to make the food and the calorie content of the ingredients; the type, weight, size, and age of the animal; the physical and biological aspects of the animal, e.g., the phenotype and genotype and the animal's health and disease states; the desired weight for the animal; and any desired weight gain for the animal. Guidelines are based on regulatory recommendations of authorities such as AAFCO and the feeding instruction from food manufacturers. For example, an animal that is underweight needs to gain weight until a desired weight is achieved. Then, the animal needs to maintain that weight. If the animal does not get enough food and loses weight, the animal again needs to gain weight until the desired weight is achieved. Unfortunately, this cycle may continue throughout the animal's life. The device of the present invention provides a way to conveniently manage these issues and the animal's weight. The device has one cavity that when filled contains an amount of food that will increase caloric intake and cause the animal consuming the food to gain weight. That cavity is used to feed the animal until the desired weight is achieved. In addition, the device has another cavity that when filled contains an amount of food that will provide a caloric intake that causes the animal consuming the food to maintain its weight. That cavity is used to feed the animal until the animal's weight decreases, if at all. If the animals weight decreases, the device is flipped and the animal is fed from the cavity that increases caloric intake until the desired weight is again achieved.

Figure 3:
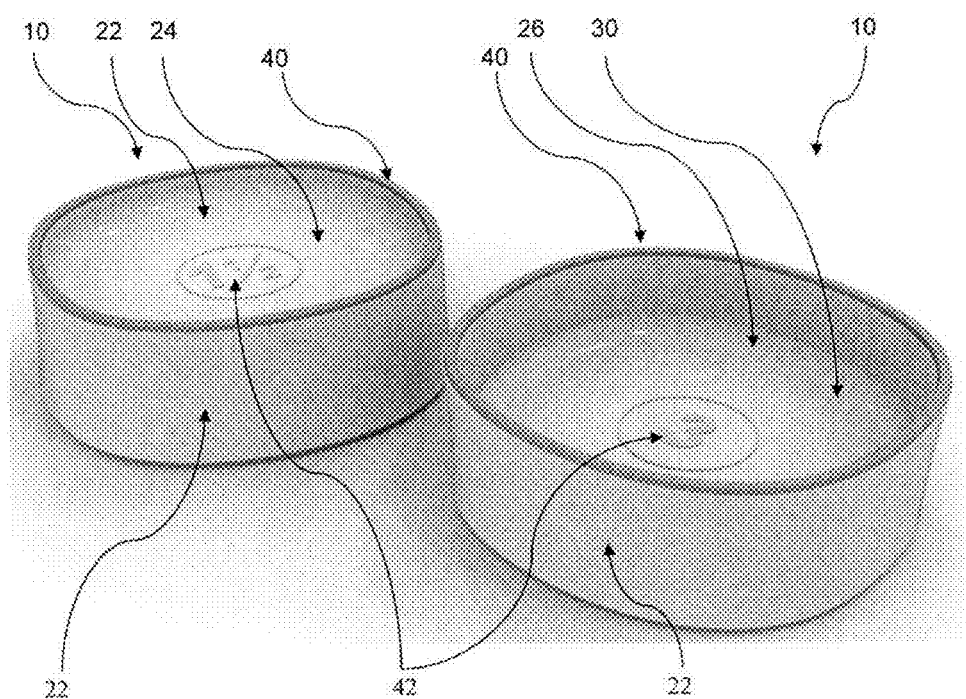
FIG. 3 shows a perspective view of a measuring device in an embodiment of the invention.

In other embodiments, the measuring device 10 comprises a container 22 having a first side 20 with a recessed portion or cavity 24 and a second opposing side 30 having a recessed portion or cavity 26 that is larger than the recessed portion or cavity 24 of the first side 20 and is detachable from the first side 20 (see FIG. 3). In one such embodiment, measuring device 10 is a food bowl wherein the first side is attached to the second side by any suitable means that permits the two sides to be detached for convenience of the user of the device, e.g., for shipping, storage, cleaning, handling, and the like. The sides are attached by any suitable reversible means such as snaps, tongue in grove connections, interference fittings such as stud-and-tube coupling system, corresponding magnets, and the like. Many such attaching means are known to skilled artisans.

In various embodiments, one or more of the cavities of measuring device 10 contain one or more obstructions designed to manage the speed with which an animal consumes foods contained in the cavities. Such obstructions are generally designed to slow rapid eating, promote regular digestion, and prevent bloating and gastrointestinal discomfort. Such obstructions and their use known to skilled artisans, e.g., U.S. Pat. No. 7,895,975 and US20090126641A1.

In various embodiments, the cavities contain the same number, type, and size obstructions or contain a different number, type, or size obstructions. In certain embodiments, one of the cavities contains one or more obstructions and the other cavity contains no obstructions. In other embodiments, the cavities contain the same number, type, and size obstructions. In other embodiments, the cavities differ in various combinations of the number, type, and size obstructions. Such obstructions and their use can be determined by a skilled artisan based upon the use of the device. In preferred embodiments, cavity 26 contains one or more obstructions and cavity 24 contains no obstructions, the same number of the same obstructions, a different number of the same obstructions, or one or more different obstructions.

In certain embodiments, the measuring device 10 comprises a container 22 having a first side 20 with a recessed portion or cavity 24 and a second opposing side 30 having a recessed portion or cavity 26 that is larger than the recessed portion or cavity 24 of the first side 20 and comprises one or more means (40) for inhibiting the device from moving about the surface in contact with the device, e.g., one or more anti-skidding devices. Such means are known to skilled artisans, e.g., silicone or rubber non-skid rings or pads affixed to or imbedded into the portion of the device that contacts such surface during use.

In other embodiments, the measuring device 10 comprises a marking or indicia (42) indicating the relative volume of material contain in the cavities of the device.

In other embodiments, the measuring device 10 comprises a container 22 having a first side 20 with a recessed portion or cavity 24 and a second opposing side 30 having a recessed portion or cavity 26 that is larger than the recessed portion or cavity 24 of the first side 20 and comprises means for stacking two or more such devices, e.g., stacking the devices for easy handling, transportation, and storage. Such means are known to skilled artisans, e.g., tongue in groove coupling connectors.

The food bowls of the invention accommodate one or more comestible ingredients such as various foods or other nutritional products. Generally, the food bowl is used with any foods useful for managing the weight of animals. In various embodiments, the foods comprise one or more comestible ingredients such as meats, grains, starches, meat meals, proteins, fibers, sugars, vitamins, minerals, aromas, colors, flavors, oils, humectants, preservatives, or any combinations thereof. In most embodiments, the foods are simply commercial foods such as commercial dog or cat foods. In some embodiments, the foods are wet, semi-moist, or dry pet foods. The pet foods can be in the form of pellets, kibbles and bits, meat emulsions, gravies, stews, soups, sauces, chunks, pieces, and the like. In certain embodiments, the foods are commercial cat foods or commercial dog foods having known ingredients and a known nutritional and caloric content. In other embodiments, the foods are customized foods made specifically for a particular animal.

Materials and methods for making the measuring devices of the invention are known to skilled artisans. In various embodiments, the measuring devices are made from any suitable materials such as wood, metal, glass, polymers, plastics, or other natural or synthetic materials using any suitable process such as carving, molding, pressing, extruding, and the like. For example, the measuring devices can be made from a polyethylene material such as linear low-density polyethylene, polypropylene, polyethylene terephthalate, and the like. Alternatively, the measuring devices may be manufactured from non-plastic, materials including, but not limited to, glass, ceramic, cardboard, metal, Styrofoam, and the like. The first side can be made from the same material or a different material than the second opposing side, particularly when they are detachable.

In a further aspect, the invention provides methods of managing the weight of animals. The methods comprise providing a measuring device comprising a container having a first side with a cavity and a second opposing side having a cavity that is larger than the cavity of the first side. The method further comprises feeding to the animal an amount of food that fills the cavity of the first side for a length of time to achieve a desired weight for the animal. Once a desired weight has been achieved, the device is flipped and an amount of food that fills the cavity of the second side is administered to the animal to maintain the desired weight of the animal. In preferred embodiments, the measuring device is a customized food bowl. In other embodiments, the measuring device is a customized food bowl and the food is a customized food.

In another aspect, the invention provides kits useful for managing the weight of an animal using the measuring devices of the invention. The kits include in separate containers in a single package or in separate containers in a virtual package, as appropriate for the kit component. (A) a measuring device comprising a container having a first side with a cavity and a second opposing side having a cavity that is larger than the cavity of the first side and (B) at least one of (1) instructions on how to use the measuring device for helping an animal achieve a desired weight; (2) instructions on how to use the measuring device for helping an animal maintain a desired weight, e.g., maintaining a healthy weight for the animal; (3) instructions on how to clean the measuring device; (4) one or more comestible ingredients such as foods, customized foods, or other nutritional products to be used in conjunction with the measuring device, e.g., a food or foods; or (5) a device for transferring the nutritional product to the measuring device, e.g., spoon or spatula.

When the kits comprise a virtual package, the kits are limited to instructions in a virtual environment in combination with one or more physical kit components. The kits may contain the kit components in any of various combinations. In one embodiment, the kit contains a measuring device as described herein. In another embodiment, one or more nutritional products or instructions can be sold with this kit or sold separately from the kit, for example, as part of a virtual kit.

The kits can encompass one or more kit components that are ordered and shipped separately to a consumer, for example, such as an order on the internet or by phone for a measuring device and a nutritional product, wherein the two articles are shipped from separate locations to the consumer's address.

In a further aspect, the invention provides a means for communicating information about or instructions for one or more of (1) using a measuring device comprising a container having a first side with a cavity and a second opposing side having a cavity that is larger than the cavity of the first side, particularly for managing the weight of an animal; (2) using the measuring device to help an animal achieve a desired weight; (3) using the measuring device to help an animal maintain a desired weight; (4) cleaning the measuring device; (5) nutritional information about comestible ingredients such as foods or other nutritional products suitable for use with the measuring device; (6) using the measuring device with customized foods, or (7) nutritional requirements for achieving or maintaining a healthy weight for animals.

The communication means can be a document, digital storage media, optical storage media, audio presentation, or visual display containing the information or instructions. In certain embodiments, the communication means can be a displayed website, a visual display kiosk, a brochure, a product label, a package insert, an advertisement, a handout, a public announcement, an audiotape, a videotape, digital streaming, a DVD, a CD-ROM, a computer readable chip, a computer readable card, a computer readable disk, a USB device, a Fire Wire device, a computer memory, and any combination thereof.

Useful information includes one or more of contact information for consumers to use if they have a question about the invention and its use. The communication means is useful for instructing on the benefits of using the present invention and communicating the approved methods for using the invention for the managing the weight of an animal using the measuring device.

In another aspect, the invention provides packages comprising indicia describing a measuring device. The measuring device comprises a container having a first side with a cavity and a second opposing side having a cavity that is larger than the cavity of the first side. The indicia can be in the form of words, symbols, pictures, photographs, figures, or combinations thereof to show details or examples of the measuring device described herein. In preferred embodiments, the indicia indicate that the device is suitable for use to manage the weight of an animal.

In other embodiments, the packages include one or more handles suitable for handling and transporting the package. In other embodiments, the package includes one or more windows for viewing the measuring device, its contents, or any parts thereof. The package can include a label affixed to the package containing a word or words, picture, design, acronym, slogan, phrase, or combination thereof, that indicates that the package contains a measuring device comprising a container having a first side with a cavity and a second opposing side having a cavity that is larger than the cavity of the first side, preferably to be used to manage the weight of an animal.

In certain embodiments, the package contains the measuring device. In other embodiments, the package contains the measuring device e.g., the device in the form of a food bowl) and one or more comestible foods, e.g., a package of food containing the device immersed in a food associated with the device. Such packages are useful to promote the measuring device in the market.

EXAMPLES

The invention can be further illustrated by the following examples, although it will be understood that these examples are included merely for purposes of illustration and are not intended to limit the scope of the invention unless otherwise specifically indicated.

Example 1

Tables 1-2 show bowl cavity sizes (by volume) for dry pet foods for weight loss weight maintenance of dogs and cats. Sizing is for single daily feedings as well as two or three feedings per day.

TABLE 1

Bowl Sized for Dry Pet food for Dogs

| Dog Weight - Kg (lbs) | Cup Volume (mL): Weight Loss/ Maintenance - 1 Feeding per day | Cup Volume (mL): Weight Loss/ Maintenance - 2 Feedings per day | Cup Volume (mL): Weight Loss/ Maintenance - 3 Feedings per day |
|---|---|---|---|
| 2.3 (5) | 150/180 | 75/90 | 50/60 |
| 4.5 (10) | 210/300 | 105/150 | 70/100 |
| 9.1 (20) | 325/500 | 162.5/250 | 108.3/166.7 |
| 13.6 (30) | 415/680 | 207.5/340 | 138.3/226.7 |
| 18.2 (40) | 500/860 | 250/430 | 166.7/286.7 |
| 22.7 (50) | 560/1005 | 280/502.5 | 186.7/335 |
| 27.3 (60) | 620/1155 | 310/577.5 | 206.7/385 |
| 36.4 (80) | 710/1450 | 355/725 | 236.7/483.3 |
| 45.5 (100) | 800/1715 | 400/857.5 | 266.7/571.7 |

TABLE 2

Bowl Sized for Dry Pet food for Cats

| Cats Weight - Kg (lbs) | Cup Volume (mL): Weight Loss/ Maintenance - 1 Feeding per day | Cup Volume (mL): Weight Loss/ Maintenance - 2 Feedings per day | Cup Volume (mL): Weight Loss/ Maintenance - 3 Feedings per day |
|---|---|---|---|
| 3.6 (8) | 118/148 | 59/74 | 39/49 |
| 4.5 (10) | 177/207 | 89/104 | 59/69 |
| 5.5 (12) | 207/237 | 104/118 | 69/79 |
| 6.4 (14) | 237/296 | 118/148 | 79/99 |

TABLE 2-continued

Bowl Sized for Dry Pet food for Cats

| Cats Weight - Kg (lbs) | Cup Volume (mL): Weight Loss/ Maintenance - 1 Feeding per day | Cup Volume (mL): Weight Loss/ Maintenance - 2 Feedings per day | Cup Volume (mL): Weight Loss/ Maintenance - 3 Feedings per day |
|---|---|---|---|
| 7.3 (16) | 266/325 | 133/163 | 89/108 |
| 9 (20) | 325/414 | 163/207 | 108/138 |
| 11.4 (25) | 414/503 | 207/251 | 138/168 |

Tables 3-4 show bowl cavity sizes (by volume) for we pet foods for weight loss weight maintenance of dogs and cats. Sizing is for single daily feedings as well as two or three feedings per day.

TABLE 3

Bowl Sized for Wet Pet food for Dogs

| Dog Weight - Kg (lbs) | Cup Volume (mL): Weight Loss/ Maintenance - 1 Feeding per day | Cup Volume (mL): Weight Loss/ Maintenance - 2 Feedings per day | Cup Volume (mL): Weight Loss/ Maintenance - 3 Feedings per day |
|---|---|---|---|
| 2.3 (5) | 197/295 | 98/147 | 66/98 |
| 4.5 (10) | 344/492 | 172/246 | 115/164 |
| 9.1 (20) | 492/787 | 246/393 | 164/262 |
| 13.6 (30) | 639/1082 | 320/541 | 213/361 |
| 18.2 (40) | 787/1327 | 393/664 | 262/442 |
| 22.7 (50) | 885/1573 | 442/787 | 295/524 |
| 27.3 (60) | 934/1770 | 467/885 | 311/590 |
| 36.4 (80) | 1082/2261 | 541/1131 | 361/754 |
| 45.5 (100) | 1229/2655 | 615/1327 | 410/885 |

TABLE 4

Bowl Sized for Wet Pet food for Cats

| Cats Weight - Kg (lbs) | Cup Volume (mL): Weight Loss/ Maintenance - 1 Feeding per day | Cup Volume (mL): Weight Loss/ Maintenance - 2 Feedings per day | Cup Volume (mL): Weight Loss/ Maintenance - 3 Feedings per day |
|---|---|---|---|
| 3.6 (8) | 224/285 | 112/142 | 75/95 |
| 4.5 (10) | 285/346 | 142/173 | 95/115 |
| 5.5 (12) | 325/407 | 163/203 | 108/136 |
| 6.4 (14) | 386/488 | 193/244 | 129/163 |
| 7.3 (16) | 447/549 | 224/275 | 149/183 |
| 9 (20) | 569/691 | 285/346 | 190/230 |
| 11.4 (25) | 691/875 | 346/437 | 230/292 |

All patents patent applications, publications, and other references cited or referred to herein are incorporated herein by reference to the extent allowed by law. The discussion of those references is intended merely to summarize the assertions made therein. No admission is made that any such patents, patent applications, publications or references, or any portion thereof, are relevant prior art for the present invention and the right to challenge the accuracy and pertinence of such patents, patent applications, publications, and other references is specifically reserved.

What is claimed is:

1. A measuring device useful for managing the weight of animals, the measuring device comprising:
    a first side with a cavity and a second opposing side having a cavity that is larger than the cavity of the first side;
    a first opening providing access to the cavity of the first side;
    a second opening providing access to the cavity of the second side, and the first opening is positioned on an opposite end of the measuring device from the second opening and faces an opposite direction relative to the second opening; and
    a continuous side wall that extends from the first opening to the second opening and defines a height of the measuring device, and the second side of the measuring device is integral with the first side.

2. The measuring device of claim 1 wherein the second side cavity is at least 1.1 times larger than the first side cavity.

3. The measuring device of claim 1 wherein the second side cavity is from 1.1 to five times as large as the first side cavity.

4. The measuring device of claim 1 wherein the first side cavity and the second side cavity have a concave shape.

5. The measuring device of claim 1 wherein the measuring device is a food bowl.

6. The measuring device of claim 1 wherein the continuous side wall has a circumference at one end that defines a perimeter of the first opening and has a circumference at an opposite end that defines a perimeter of the second opening.

7. The measuring device of claim 1 wherein a portion of the continuous side wall of the measuring device forms a side wall of the first side cavity, and another portion of the continuous side wall of the measuring device forms a side wall of the second side cavity.

8. The measuring device of claim 1 wherein the first side cavity is sized to contain an amount of food that promotes weight loss by the animal and the second side cavity is sized to contain an amount of food that enables the animal to maintain a desired weight.

9. The measuring device of claim 1 wherein the second side cavity is sized to contain an amount of food that promotes weight gain by the animal and the first side cavity is sized to contain an amount of food that enables the animal to maintain a desired weight.

10. A method of managing the weight of an animal comprising:
    providing the measuring device of claim 1;
    feeding to the animal an amount of food that fills the cavity of the first side for a length of time to achieve a desired weight in the animal by using the measuring device in a first position in which the opening of the cavity of the second side is positioned on a surface on which the measuring device rests such that the opening of the cavity of the second side faces downward toward the surface;
    moving the measuring device from the first position to a second position; and
    feeding to the animal an amount of food that fills the cavity of the second side to maintain the weight of the animal after the animal has achieved the desired weight.

11. The method of claim 10 wherein the moving of the measuring device from the first position to the second position comprises flipping the measuring device such that the first side cavity switches positions with the second side cavity.

12. The method of claim 10 wherein the moving of the measuring device from the first position to the second position comprises preventing access to the first side cavity.

13. The method of claim 10 wherein the moving of the measuring device from the first position to the second position comprises situating the opening of the second side cavity to face upward from the surface on which the measuring device rests.

14. The method of claim 10 wherein the feeding to the animal the amount of food that fills the cavity of the first side comprises feeding to the animal a first type of food that is formulated to provide a predetermined amount of calories based on the amount of food that fills the cavity of the first side.

15. The method of claim 14 wherein the feeding to the animal the amount of food that fills the cavity of the second side comprises feeding to the animal a second type of food that is formulated to provide a predetermined amount of calories based on the amount of food that fills the cavity of the second side.

16. The method of claim 15 wherein the first type of food is formulated such that the amount of the first type of food that fills the first side cavity promotes weight loss by the animal, and the second type of food is formulated such that the amount of the second type of food that fills the second side cavity enables the animal to maintain a desired weight.

17. The method of claim 15 wherein the second type of food is formulated such that the amount of the second type of food that fills the second side cavity promotes weight gain by the animal, and the first type of food is formulated such that the amount of the first type of food that fills the first side cavity enables the animal to maintain a desired weight.

* * * * *